L. R. BEACH.
PEANUT CULTIVATING AND HARVESTING PLOW.
APPLICATION FILED NOV. 26, 1917.

1,290,490.  Patented Jan. 7, 1919.

Witnesses

Inventor
L. R. Beach
By
Attorney

UNITED STATES PATENT OFFICE.

LONNIE R. BEACH, OF COLQUITT, GEORGIA.

PEANUT CULTIVATING AND HARVESTING PLOW.

1,290,490.     Specification of Letters Patent.     Patented Jan. 7, 1919.

Application filed November 26, 1917. Serial No. 203,981.

*To all whom it may concern:*

Be it known that I, LONNIE R. BEACH, a citizen of the United States, residing at Colquitt, in the county of Early, State of Georgia, have invented certain new and useful Improvements in Peanut Cultivating and Harvesting Plows; and I do hereby declare the following to be a full, clear, and exact description of the invention, such as will enable others skilled in the art to which it appertains to make and use the same.

This invention relates to plow blades, and has particular reference to devices for working and harvesting peanut vines.

The object of the invention is to provide a plow blade which is peculiarly adapted for turning peanut vines out of the ground in harvesting a peanut crop, without tearing the peanuts from the vines. While it is especially adapted for harvesting peanuts the construction of the blade is also such that it may be employed for cultivating low growing crops or young plants without covering the plants while stirring up the dirt to a comparatively great depth close to the roots of the plants.

It is also an object of the invention to provide a plow point of the above described character which may be mounted upon any plow stock of ordinary construction, so that it may be utilized without the necessity of providing a particular standard or stock therewith.

With the above objects in view, and such others relating to the details of construction, as may hereinafter appear, my invention will now be fully set forth and described, reference being had to the accompanying drawings.

In the drawings:—

Figure 1:
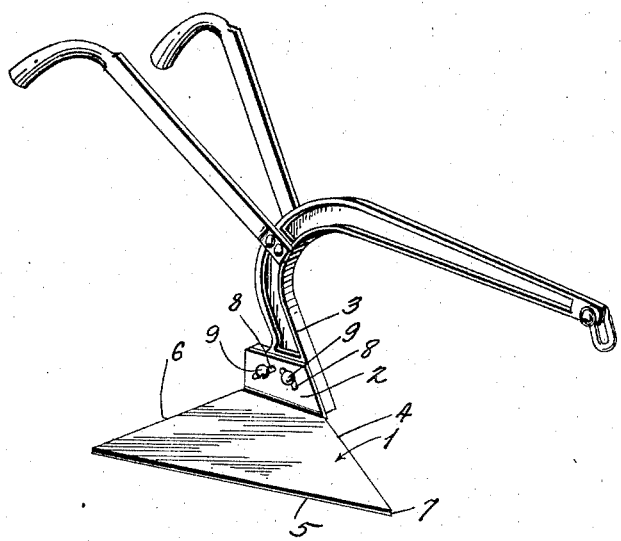
Figure 1 is a perspective view of the plow blade mounted upon a plow stock.
Figure 2:
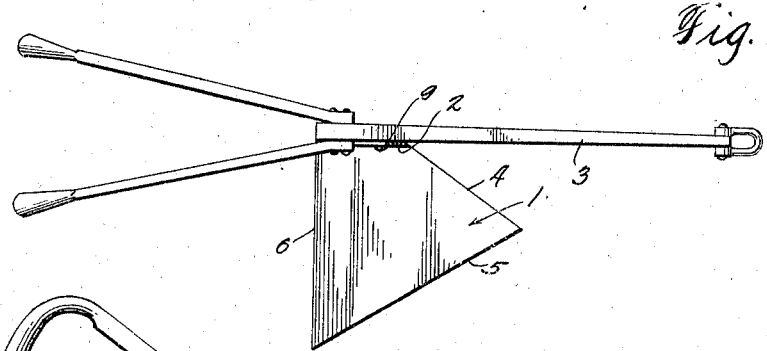
Fig. 2 is a plan view thereof.
Figure 3:
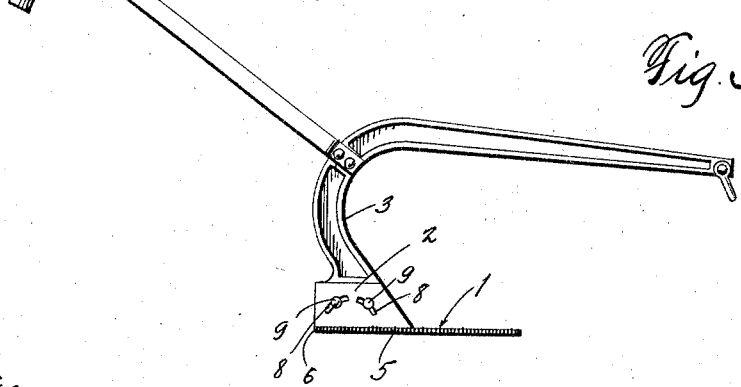
Fig. 3 is a side elevation.

Referring more particularly to the drawings, 1 represents the blade which is formed from a blank having a general triangular conformation. One corner of the blank is turned upwardly while the blade is disposed horizontally, the upturned portion 2 standing at right angles to the major portion of the blank and having its upwardly projected corner cut off substantially parallel to the line of its bend. The upturned portion 2 provides a means for attaching the blade to a plow stock 3. The plow stock 3 may be of any of the ordinary constructions.

The blade body which is left after the element 2 is upturned, then consists of a flat sheet having a short side 4 extending from the element 2, and a long side 5 which extends from the base 6, the sides 4 and 5 converging to the apex or plow point 7.

In attaching the plow blade to the beam 3, the arcuately elongated openings 8 are employed, the openings 8 receiving therein the securing bolts 9 in such a manner that the plow beam lies upon the outer face of the flange 2, and the arcuate openings providing for the proper inclination of the blade with relation to the ground surface so that the point of the plow will be directed into the ground at the proper inclination. Then, in the use of the plow, it is so directed along the row, that the flange 2 grazes the left hand sides of the plants, where the plow is so constructed that the blade portion 1 lies to the right of the flange 2. This brings the flange 2 and the plow beam 3 at one side of the row, while the blade 1 passes below the plants and unearths them without causing the peanuts to be torn from the roots before they are gathered.

The blade may be used with success as a cultivating implement, by going along the row with the left or outer side of the flange 2 toward the plants and plowing to a comparatively great depth close to the plants, and then, on a return trip, bringing the blade of the plow toward the row so as to throw the dirt toward the plants, and hilling up the row without covering the small growth. This process of cultivation with my improved implement breaks up the ground to a comparatively great depth close to the small plants without danger of covering the latter.

What I claim as my invention is:—

An implement of the character described comprising a plow beam having a standard formed with a flat vertically disposed foot, a triangular shaped blade having one corner portion upturned at right angles thereto and located at one side of the foot, arcuate shaped slots formed in the upturned portion of the blade in the radius of a circle, bolts engaged in the foot and slots to permit adjustment of the blade at an angle to a horizontal plane.

In testimony whereof, I affix my signature in the presence of two witnesses.

LONNIE R. BEACH.

Witnesses:
B. R. COLLINS,
S. J. BEACH.